United States Patent
Seo et al.

(10) Patent No.: US 9,755,768 B2
(45) Date of Patent: Sep. 5, 2017

(54) METHOD FOR MEASURING CHANNEL AND INTERFERENCE IN WIRELESS COMMUNICATION SYSTEM

(71) Applicant: LG ELECTRONICS INC., Seoul (KR)

(72) Inventors: Hanbyul Seo, Seoul (KR); Kijun Kim, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 65 days.

(21) Appl. No.: 14/762,754

(22) PCT Filed: Jan. 23, 2014

(86) PCT No.: PCT/KR2014/000665
§ 371 (c)(1),
(2) Date: Jul. 22, 2015

(87) PCT Pub. No.: WO2014/123317
PCT Pub. Date: Aug. 14, 2014

(65) Prior Publication Data
US 2015/0358093 A1    Dec. 10, 2015

Related U.S. Application Data

(60) Provisional application No. 61/762,295, filed on Feb. 7, 2013.

(51) Int. Cl.
*H04W 4/00*    (2009.01)
*H04B 17/309*    (2015.01)
(Continued)

(52) U.S. Cl.
CPC ......... *H04B 17/309* (2015.01); *H04B 7/0456* (2013.01); *H04B 17/345* (2015.01); *H04W 88/02* (2013.01)

(58) Field of Classification Search
CPC ..... H04L 12/4633; H04L 67/10; H04L 69/22; H04L 45/745; H04L 69/324;
(Continued)

(56) References Cited

U.S. PATENT DOCUMENTS 9,065,527 B2 * 6/2015 Hoshino ............... H04B 7/155
2009/0179755 A1 * 7/2009 Bachl .................. H04W 72/082
340/540
(Continued)

FOREIGN PATENT DOCUMENTS

CN    102714565 A    12/2010
CN    104285405 A    10/2012
(Continued)

OTHER PUBLICATIONS

QUALCOMM Europe, "UE-RS Patterns for LTE-A," 3GPP TSG-RAN WG1 #58, R1-093105, Shenzhen, China, Aug. 24-28, 2009, pp. 1-9.

*Primary Examiner* — Clemence Han
(74) *Attorney, Agent, or Firm* — Birch, Stewart, Kolasch & Birch, LLP

(57) ABSTRACT

Disclosed in the present invention is a method for user equipment performing a measurement in a wireless communication system. More particularly, the method comprises the steps of: receiving, from a network, information related to measuring resource combination; grouping into one time domain measurement resource group a plurality of time domain measuring resources of a time domain by using the information related to the measuring resource combination; and performing the measurement with the assumption that identical precoding is applied to or identical interference occurs in the time domain measurement resource group, wherein the information related to the measurement resource
(Continued)

combination includes information related to the number of the plurality of time domain measurement resources.

14 Claims, 12 Drawing Sheets

(51) Int. Cl.
    *H04B 17/345*    (2015.01)
    *H04B 7/0456*    (2017.01)
    *H04W 88/02*    (2009.01)

(58) Field of Classification Search
    CPC ............... H04L 41/0843; H04L 47/125; H04L 41/0816; H04L 41/0672; G06F 9/45558; G06F 2009/45595; G06F 2009/45583
    See application file for complete search history.

(56) References Cited

U.S. PATENT DOCUMENTS

| | | | |
|---|---|---|---|
| 2009/0257381 A1* | 10/2009 | Kuri | H04B 7/0619 370/329 |
| 2010/0080154 A1 | 4/2010 | Noh et al. | |
| 2011/0051749 A1 | 3/2011 | Cheng et al. | |
| 2011/0255505 A1* | 10/2011 | Liu | H04L 5/0007 370/330 |
| 2011/0310829 A1* | 12/2011 | Ji | H04L 5/0037 370/329 |
| 2011/0310831 A1 | 12/2011 | Bhattad et al. | |
| 2011/0310838 A1* | 12/2011 | Zheng | H04L 5/0048 370/330 |
| 2012/0207243 A1* | 8/2012 | Koivisto | H04B 7/0469 375/296 |
| 2013/0077560 A1 | 3/2013 | Horiuchi et al. | |
| 2013/0242769 A1* | 9/2013 | Hammarwall | H04L 5/0016 370/252 |
| 2015/0207646 A1* | 7/2015 | Nilsson | H04L 25/0212 370/252 |

FOREIGN PATENT DOCUMENTS

| | | |
|---|---|---|
| CN | 104285405 A | 1/2015 |
| KR | 10-2011-0022875 A | 3/2011 |
| WO | WO 2011/129628 A2 | 10/2011 |
| WO | WO 2011/160097 A1 | 12/2011 |
| WO | WO 2011/161907 A1 | 12/2011 |

* cited by examiner (a) Control-Plane Protocol Stack (b) User-Plane Protocol Stack ▨ : DM-RS Group 1

▩ : DM-RS Group 2

METHOD FOR MEASURING CHANNEL AND INTERFERENCE IN WIRELESS COMMUNICATION SYSTEM

CROSS REFERENCE TO RELATED APPLICATIONS

This application is the National Phase of PCT International Application No. PCT/KR2014/000665, filed on Jan. 23, 2014, which claims priority under 35 U.S.C. 119(e) to U.S. Provisional Application No. 61/762,295, filed on Feb. 7, 2013, all of which are hereby expressly incorporated by reference into the present application.

TECHNICAL FIELD

The present invention relates to a wireless communication system, and more particularly, to a method for measuring a channel and interference in a wireless communication system.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system e-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connecto to an external network in a manner of being situated at the end of a network (e-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipements by being set to one of 1.25 MHz, 2.5 MHz, 5 MHz, 10 MHz, 15 MHz, and 20 MHz of bandwidths. dsifferent cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

Based on the aforementioned discussion, hereinafter, an object of the present invention is to provide a method for measuring a channel and interference in a wireless communication system.

Technical Solution

In one aspect of the present invention, a method for enabling a user equipment to perform a measurement in a wireless communication system comprises the steps of receiving, from a network, information on measurement resource combination; grouping a plurality of time domain measurement resources of a time domain into one time domain measurement resource group by using the information on the measurement resource combination; and performing the measurement on the assumption that same precoding is applied to or same interference occurs in the time domain measurement resource group, wherein the information on the measurement resource combination includes information on the number of the plurality of time domain measurement resources.

In this case, the information on the measurement resource combination includes information on the number of the continuous time domain measurement resources and information on one or more time domain measurement resources which are not grouped into the one time domain measurement resource group of the continuous time domain measurement resources.

Preferably, the method further comprises the step of grouping a plurality of frequency domain measurement resources into one frequency domain measurement resource group by using the information on the measurement resource combination, wherein the step of performing the measurement includes assuming that same precoding is applied to or same interference occurs in the frequency domain measurement resource group of the time domain measurement resource group. Additionally, the information on the measurement resource combination may include information on the number of the continuous frequency domain measurement resources and information on one or more frequency domain measurement resources which are not grouped into the one frequency domain measurement resource group of the continuous frequency domain measurement resources.

More preferably, the method may further comprise the step of receiving information on a QCL (Quasi Co-Location) hopping pattern from the network, wherein the QCL hopping pattern divides the plurality of time domain measurement resources grouped into the one time domain measurement resource group in accordance with a transmission point of a downlink signal. In this case, the QCL hopping pattern includes information on change of a reference signal which is a reference of the QCL.

Also, the method further comprises the step of receiving one downlink control information from the network, wherein the one downlink control information schedules downlink transmission at the plurality of time domain measurement resources.

In another aspect of the present invention, a user equipment in a wireless communication system comprises a wireless communication module for transmitting and receiving a signal to and from a network; and a processor for processing the signal, wherein the processor groups a plurality of time domain measurement resources of a time domain into one time domain measurement resource group by using information on measurement resource combination, which is received from the network and performs a measurement on the assumption that same precoding is applied to or same interference occurs in the time domain measurement resource group, and the information on the measurement resource combination includes information on the number of the plurality of time domain measurement resources.

Advantageous Effects

According to the embodiment of the present invention, a channel and interference may be measured more efficiently in a wireless communication system.

It will be appreciated by persons skilled in the art that that the effects that can be achieved through the present invention are not limited to what has been particularly described hereinabove and other advantages of the present invention will be more clearly understood from the following detailed description.

BEST MODE FOR CARRYING OUT THE INVENTION

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

And, in the present specification, a base station can be named by such a comprehensive terminology as an RRH (remote radio head), an eNB, a TP (transmission point), an RP (reception point), a relay and the like.

Figure 1:
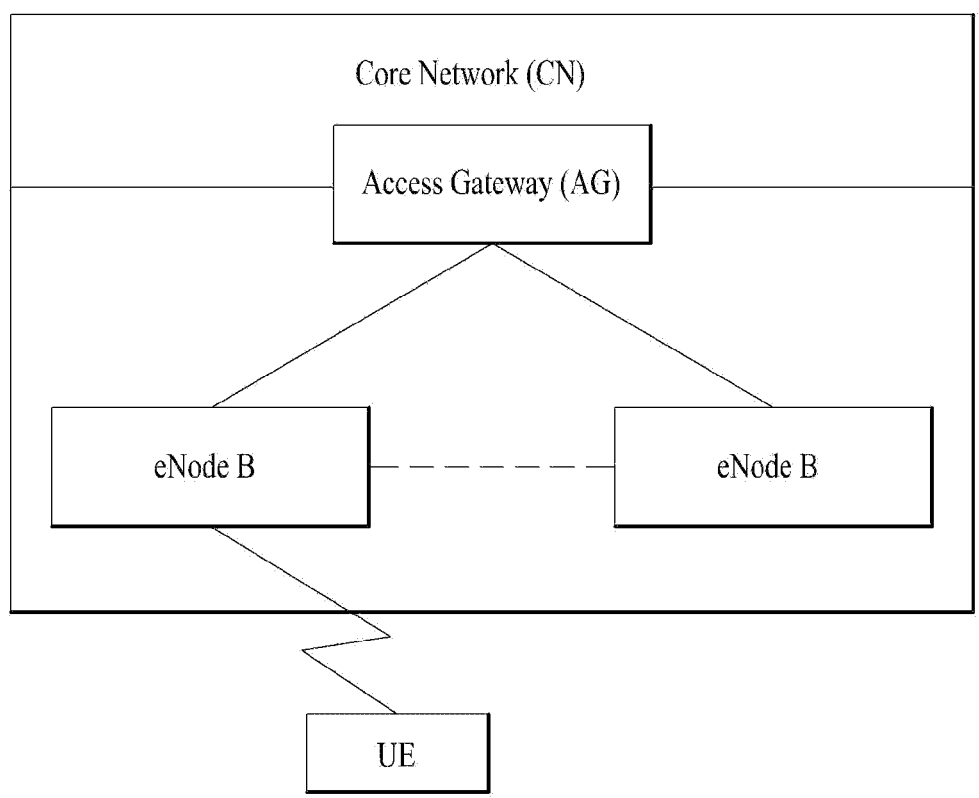
FIG. 1 is a schematic diagram of E-UMTS network structure as one example of a wireless communication system.
Figure 2:
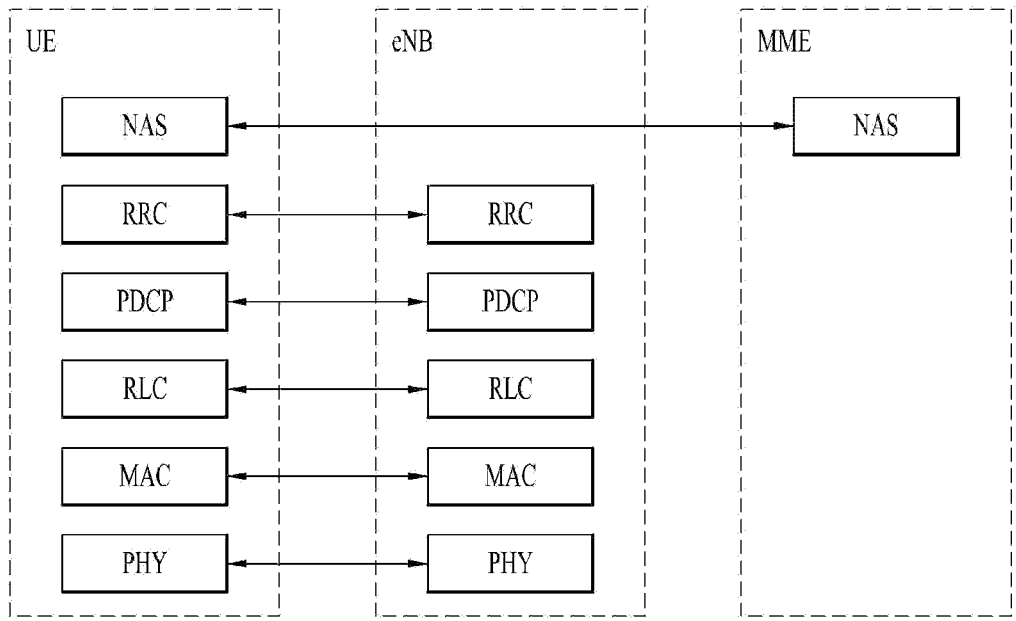
FIG. 2 is a diagram for structures of control and user planes of radio interface protocol between a 3GPP radio access network standard-based user equipment and E-UTRAN.
Figure 2:
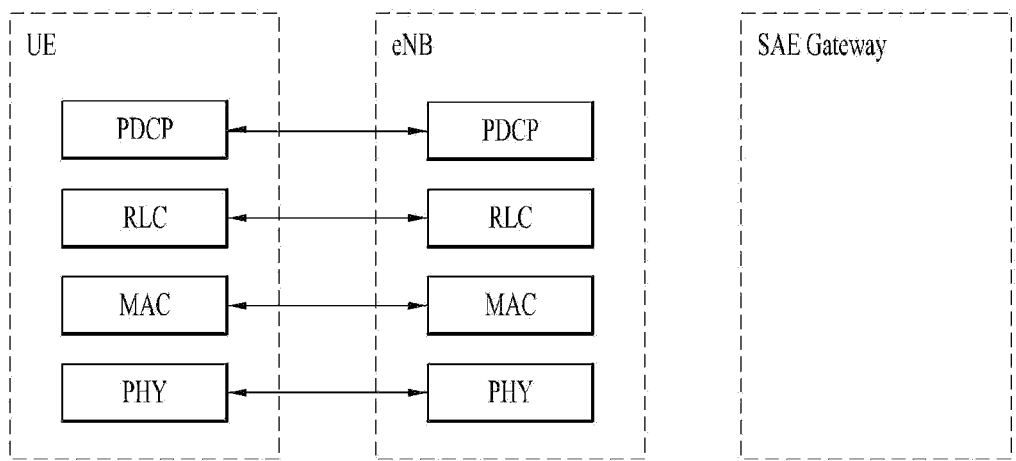

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/ broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
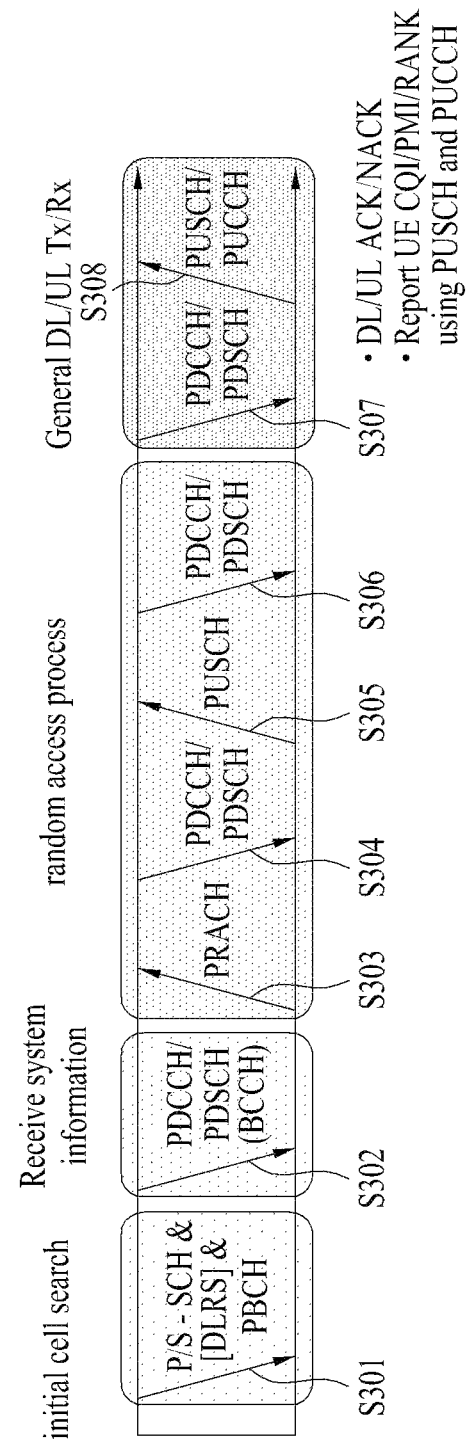
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
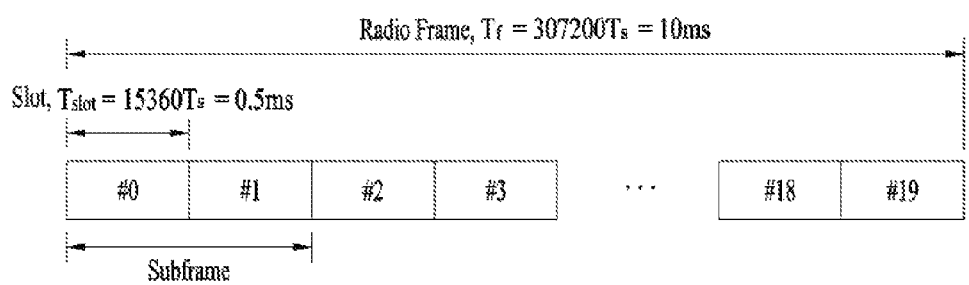
FIG. 4 is a diagram for a structure of a radio frame in LTE system.

FIG. 4 is a diagram for a structure of a radio frame in LTE system.

Referring to FIG. 4, one radio frame has a length of 10 ms ($327{,}200 \times T_S$) and is constructed with 10 subframes in equal size. Each of the subframes has a length of 1 ms and is constructed with two slots. Each of the slots has a length of 0.5 ms ($15{,}360 \times T_S$). In this case, $T_S$ indicates a sampling time and is represented as $T_S = 1/(15\ \text{kHz} \times 2048) = 3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
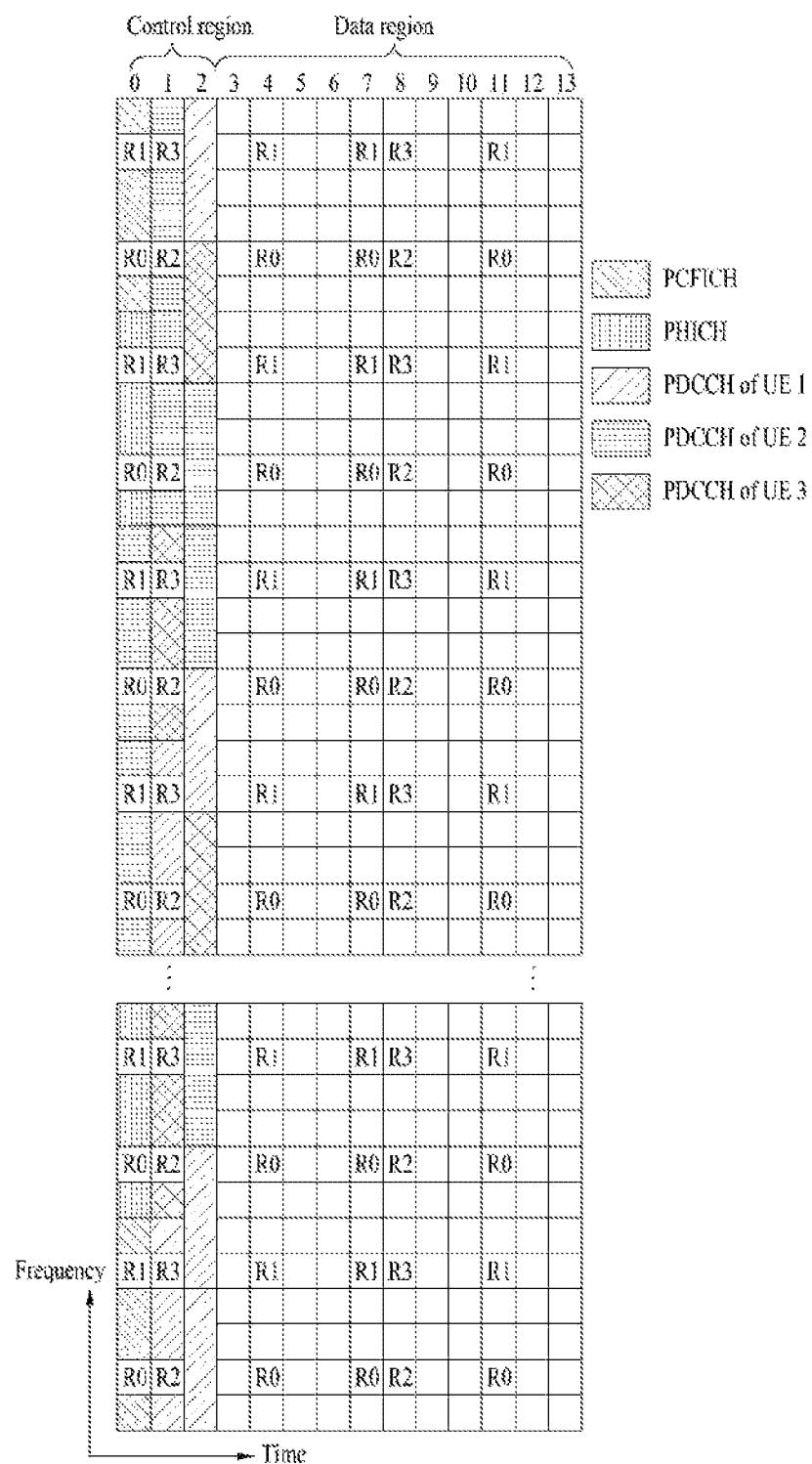
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R0 to R3 may indicate a reference signal (hereinafter abbreviated RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control foiinat indicator channel (PCFICH), a physical hybrid-ARQ indicator channel (PHICH), a physical downlink control channel (PDCCH), and the like.

The PCFICH (physical control format indicator channel) informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on a user equipment (one or a plurality of user equipments) receiving data of PDSCH, a method of receiving and decoding the PDSCH data performed by the user equipment, and the like is transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transport block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
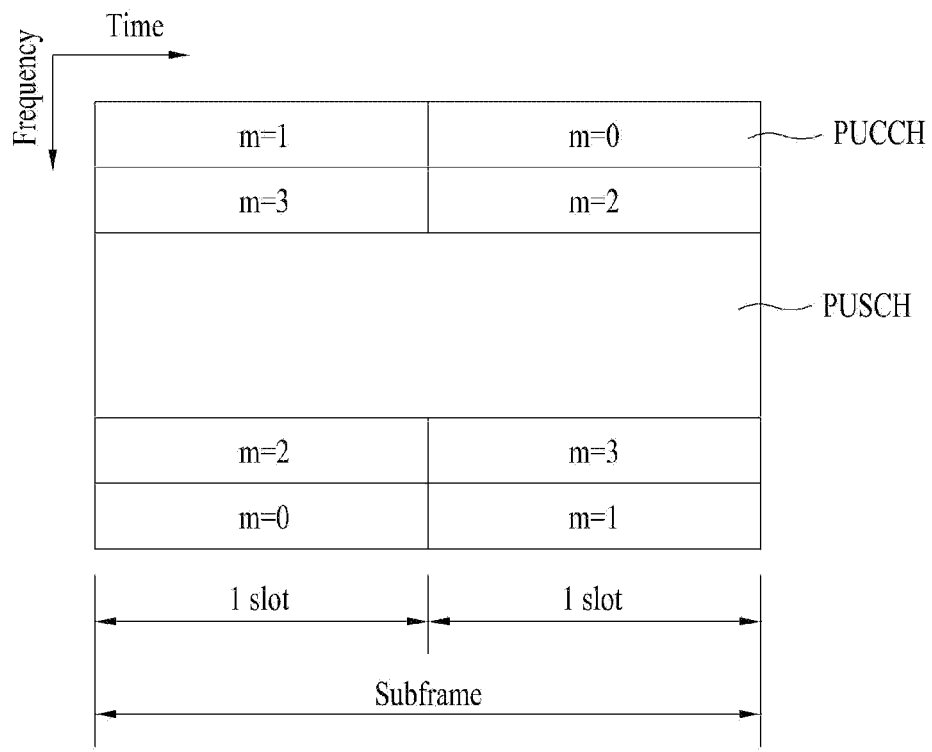
FIG. 6 is a diagram for a structure of an uplink radio frame in LTE system.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 6 shows an example that the PUCCHs satisfying conditions (e.g., m=0, 1, 2, 3) are assigned to a subframe.

In the following description, MIMO system is explained. The MIMO (multiple-input multiple-output) is a method using a plurality of transmitting antennas and a plurality of receiving antennas. The efficiency in transmitting and receiving data may be enhanced by the MIMO. In particular, by using a plurality of the antennas at a transmitting end or a receiving end in a radio communication system, it may be able to increase a capacity and enhance performance. In the following description, the MIMO may be called a 'multi antenna'.

In the multiple antenna technology, it may not depend on a single antenna path to receive a whole message. Data is completed in a manner of combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

Figure 7:
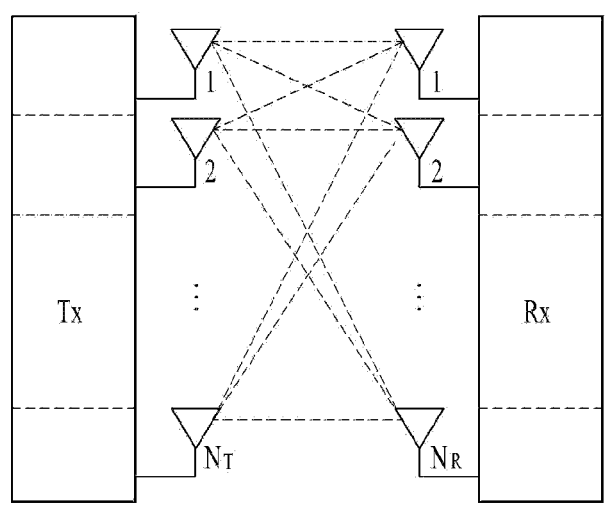
FIG. 7 is a diagram for a configuration of a multiple antenna communication system.

A block diagram of a general multi-antenna (MIMO) communication system is depicted in FIG. 7.

$N_T$ number of transmitting antenna is installed in a transmitting end and $N_R$ number of receiving antenna is installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as $R_o$ in case of using a single antenna, the transfer rate using multiple antennas can be theoretically increased as much as the maximum transfer rate $R_o$ multiplied by a rate of increase $R_i$, as shown in the following Equation 1. In this case, the $R_i$ is a smaller value of the $N_T$ and the $N_R$.

$$R_i = \min(N_T, N_R) \qquad \text{[Equation 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a $3^{rd}$ generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

In case of mathematically modeling a communication method of the multi-antenna system in order to explain it with more specific way, it can be represented as follows. As shown in FIG. 7, assume that there exist $N_T$ number of transmitting antenna and $N_R$ number of receiving antenna. First of all, if we look into a transmission signal, since the maximum number of information capable of being transmitted is $N_T$ in case that there exists $N_T$ number of transmitting antenna, transmission information can be represented as a vector in the following Equation 2.

$$s = [s_1, s_2, \ldots, s_{N_T}]^T \quad [2]$$

Meanwhile, for each of the transmission informations $s_1, s_2, \ldots, s_{N_T}$, a transmit power may be differentiated according to the each of the transmission informations. In this case, if each of the transmit powers is represented as $P_1, P_2, \ldots, P_{N_T}$, transmit power-adjusted transmission information can be represented as a vector in the following Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

And, if $\hat{s}$ is represented using a diagonal matrix P, it can be represented as a following Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, let's consider a case that the NT number of transmission signal $x_1, x_2, \ldots, x_{N_T}$, which is practically transmitted, is configured in a manner of applying a weighted matrix W to the adjusted information vectors $\hat{s}$. In this case, the weighted matrix performs a role of distributing the transmission information to each of the antennas according to the situation of the transmission channel and the like. The transmission signal $x_1, x_2, \ldots, x_{N_T}$ can be represented using a vector X in the following Equation 5. In this case, $W_{ij}$ means a weighting between an ith transmitting antenna and jth information. The W is called the weighted matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Equation 6.

$$\text{rank}(H) \leq \min(N_T, N_R) \quad \text{[Equation 6]}$$

And, let's define each of the informations different from each other, which are transmitted using a multi-antenna technology, as a transport stream or simply a stream. The stream can be named a layer. Then, the number of the transport stream is naturally configured not to be greater than the rank of the channel, which is a maximum number capable of transmitting informations different from each other. Hence, the channel matrix H can be represented as Equation 7 in the following.

$$\text{\# of streams} \leq \text{rank}(H) \leq \min(N_T, N_R) \quad [7]$$

In this case, '# of streams' indicates the number of streams. Meanwhile, in this case, it should be cautious that one stream can be transmitted via more than one antenna.

Various methods making one or more streams correspond to many antennas may exist. These methods can be described in accordance with the kind of the multi-antenna technology in the following description. A case of transmitting one stream via many antennas may be called a space diversity scheme and a case of transmitting many streams via many antennas may be called a space multiplexing scheme. Naturally, a hybrid form of the space diversity and the space multiplexing is also available.

Meanwhile, it is expected that a LTE-A system, which is a standard of a next generation mobile communication system, will support a CoMP (coordinated multi point) transmission method, which is not supported by the conventional standard, to enhance a data transmission rate. In this case, the CoMP transmission method is a transmission method for two or more base stations or cells to communicate with the user equipment in a manner of cooperating with each other to enhance a communication performance between the user equipment situated at a radio shadow zone and the base station (a cell or a sector).

The CoMP transmission method can be classified into a join processing (COMP jointprocessing, CoMP-JP) method in the form of a cooperative MIMO via data sharing and a coordinated scheduling/beam forming (CoMP-coordinated scheduling/beamforming, CoMP-CS/CB) method.

According to the joint processing (CoMP-JP) method in DL, a user equipment may be able to instantaneously receive data simultaneously from each of the base stations performing the CoMP transmission method. And, a reception performance can be enhanced in a manner of combining the signals received from each of the base stations (Joint Transmission (JT)). And, it is also possible to consider a method of transmitting a data to the user equipment on a specific timing by one of the base stations performing the CoMP transmission method (Dynamic Point Selection (DPS)). On the other hand, according to the coordinated scheduling/beamforming method (CoMP-CS/CB), the user equipment may be able to instantaneously receive data from a single base station via a beamforming.

According to the joint processing (CoMP-JP) method in UL, each of the base stations may be able to simultaneously receive PUSCH signal from the user equipment (Joint Reception (JR)). On the other hand, according to the coordinated scheduling/beamforming method (COMP-CS/CB), only a single base station may be able to receive the PUSCH. In this case, the decision to use the coordinated scheduling/beamforming method is determined by the coordinating cells (or base stations).

In the following description, an example for a transmission mode of a downlink data channel is described. Currently, 3GPP LTE standard document, specifically, 3GPP TS 36. 213 document defines a transmission mode of a downlink data channel as shown in Table 1 and Table 2 in the following. The transmission mode is set to a user equipment via an upper layer signaling, i.e., RRC signaling.

TABLE 1

| Transmission mode | DCI format | Transmission scheme of PDSCH corresponding to PDCCH |
|---|---|---|
| Mode 1 | DCI format 1A | Single-antenna port, port 0 |
| | DCI format 1 | Single-antenna port, port 0 |
| Mode 2 | DCI format 1A | Transmit diversity |
| | DCI format 1 | Transmit diversity |
| Mode 3 | DCI format 1A | Transmit diversity |
| | DCI format 2A | Large delay CDD or Transmit diversity |
| Mode 4 | DCI format 1A | Transmit diversity |
| | DCI format 2 | Closed-loop spatial multiplexing or Transmit diversity |
| Mode 5 | DCI format 1A | Transmit diversity |
| | DCI format 1D | Multi-user MIMO |
| Mode 6 | DCI format 1A | Transmit diversity |
| | DCI format 1B | Closed-loop spatial multiplexing using a single transmission layer |
| Mode 7 | DCI format 1A | If the number of PBCH antenna ports is one, Single-antenna port, port 0 is used, otherwise Transmit diversity |
| | DCI format 1 | Single-antenna port, port 5 |
| Mode 8 | DCI format 1A | If the number of PBCH antenna ports is one, Single-antenna port, port 0 is used, otherwise Transmit diversity |
| | DCI format 2B | Dual layer transmission, port 7 and 8 or single-antenna port, port 7 or 8 |
| Mode 9 | DCI format 1A | Non-MBSFN subframe: if the number of PBCH antenna ports is one, Single-antenna port, port 0 is used, otherwise Transmit diversity MBSFN subframe: Single-antenna port, port 7 |
| | DCI format 2C | Up to 8 layer transmission, ports 7-14 or single-antenna port, port 7 or 8 |
| Mode 10 | DCI format 1A | Non-MBSFN subframe: If the number of PBCH antenna ports is one, Single-antenna port, port 0 is used, otherwise Transmit diversity MBSFN subframe: Single-antenna port, port 7 |
| | DCI format 2D | Up to 8 layer transmission, ports 7-14 or single-antenna port, port 7 or 8 |

Referring to Table 1, a transmission mode and a DCI format corresponding to the transmission mode (i.e., a transmission mode-based DCI format) are included in the document. And, a DCI format 1A for a Fall-back mode, which is capable of being applied irrespective of each transmission mode, is defined in the document. As an example of an operation of a transmission mode, referring to Table 1, if a user equipment performs a blind decoding on PDCCH masked with C-RNTI and then detects a DCI format 1B, the user equipment decodes PDSCH in an assumption that the PDSCH has been transmitted with a closed-loop spatial multiplexing scheme using a single transmission layer.

In Table 1, a transmission mode 10 indicates a downlink data channel transmission mode of the aforementioned CoMP transmission method. For instance, referring to Table 1, if a user equipment performs a blind decoding on PDCCH masked with C-RNTI and then detects a DCI format 2D, the user equipment decodes PDSCH in an assumption that the PDSCH has been transmitted with a multi-layer transmission scheme based on antenna port 7 to 14, i.e., DM-RS. Or, the user equipment decodes PDSCH in an assumption that the PDSCH has been transmitted with a single antenna transmission scheme based on DM-RS antenna port 7 or 8.

On the contrary, if the user equipment performs blind decoding on PDCCH masked with C-RNTI and then detects a DCI format 1A, a transmission mode varies according to whether a corresponding subframe corresponds to an MBSFN subframe. For instance, if the corresponding subframe corresponds to a non-MBSFN subframe, the user equipment decodes PDSCH in an assumption that the PDSCH has been transmitted with a single antenna transmission scheme based on a CRS of an antenna port 0 or a CRS-based transmit diversity scheme. And, if the corresponding subframe corresponds to an MBSFN subframe, the user equipment decodes the PDSCH in an assumption that the PDSCH has been transmitted with a single antenna transmission based on a DM-RS of an antenna port 7.

In the following description, a reference signal is explained in more detail.

In general, a reference signal, which is already known to both a transmitting end and a receiving end, is transmitted from the transmitting end to the receiving end together with data to measure a channel. The reference signal plays not only a role of measuring a channel but also a role of making a demodulation process to be performed in a manner of informing the receiving end of a modulation scheme. The reference signal is classified into a dedicated reference signal (DRS) used for an eNB and a specific user equipment (i.e., UE-specific reference signal) and a cell-specific reference signal used for all UEs in a cell (i.e., common reference signal or cell specific RS (CRS)). The cell-specific reference signal includes a reference signal used for reporting CQI/PMI/RI to an eNB in a manner of measuring CQI/PMI/RI in a user equipment. This sort of reference signal is called a CSI-RS (channel state information-RS).

Figure 8:
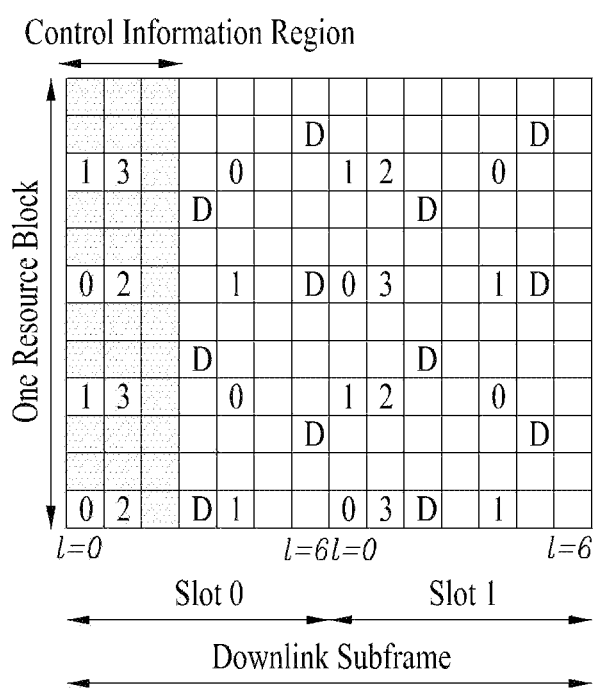
FIG. 8 and FIG. 9 are diagrams of a structure of a reference signal in LTE system supportive of downlink transmission using 4 antennas.
Figure 9:
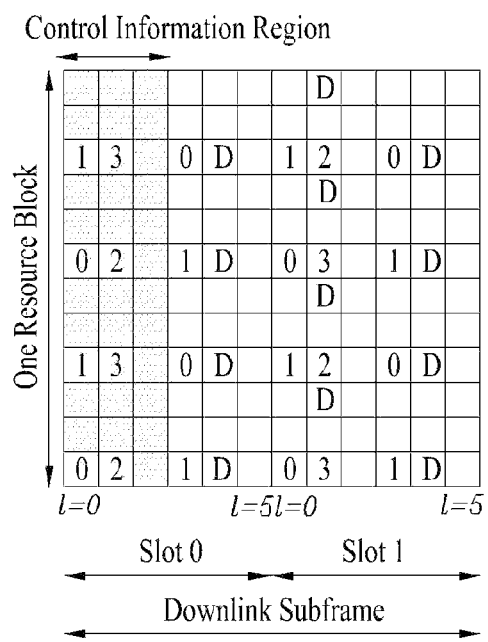

FIG. 8 and FIG. 9 are diagrams of a structure of a reference signal in LTE system supportive of downlink transmission using 4 antennas. In particular, FIG. 8 shows a case of a normal cyclic prefix and FIG. 9 shows a case of an extended cyclic prefix.

Referring to FIG. 8 and FIGS. 9, 0 to 3 written on a grid may mean the CRS (common reference signal), which is a cell-specific reference signal, transmitted for the channel measurement and the data demodulation in a manner of corresponding to antenna port 0 to 3, respectively. The cell-specific reference signal CRS can be transmitted to a user equipment via the control information region as well as the data information region.

And, 'D' written on the grid may mean a downlink DM-RS (demodulation RS), which is a user-specific RS. The DM-RS supports a single antenna port transmission via the data region, i.e., the PDSCH. The user equipment is signaled whether the DM-RS, which is the user equipment-specific RS, exists or not via an upper layer. FIG. 8 and FIG. 9 show an example of the DM-RS corresponding to an antenna port 5. The DM-RSs corresponding to an antenna port 7 to 14, i.e., total 8 antenna ports, are also defined by 3GPP standard document 36.211.

Figure 10:
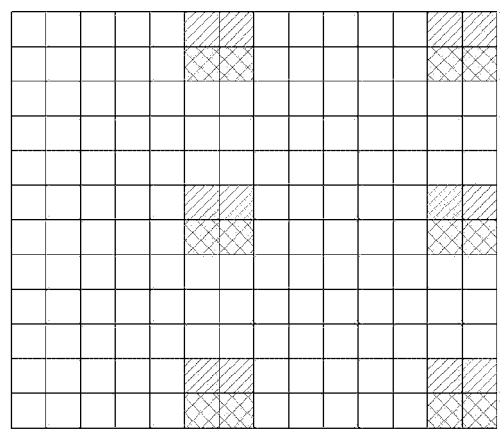
FIG. 10 is a diagram for an example of assigning a downlink DM-RS defined by a current 3GPP standard document.

FIG. 10 is a diagram for an example of assigning a downlink DM-RS defined by a current 3GPP standard document.

Referring to FIG. 10, DM-RSs corresponding to antenna ports {7, 8, 11, 13} are mapped to a DM-RS group 1 using a sequence according to an antenna port and DM-RSs corresponding to antenna ports {9, 10, 12, 14} are mapped to a DM-RS group 2 using a sequence according to an antenna port as well.

Meanwhile, the aforementioned CSI-RS is proposed to perform channel measurement for PDSCH irrespective of a CRS. Unlike the CRS, the CSI-RS can be defined by maximum 32 resource configurations different from each other to reduce inter-cell interference (ICI) in a multicell environment.

CSI-RS (resource) configurations differ according to the number of antenna ports and CSI-RSs defined as maximally different CSI-RS configurations are configured to be transmitted between neighbor cells. Unlike the CRS, the CSI-RS supports a maximum of eight antenna ports. In the 3GPP standard, antenna ports 15 to 22, that is, a total of eight antenna ports, are allocated as antenna ports for CSI-RS. Tables 2 and 3 below show CSI-RS configurations defined in the 3GPP standard. In particular, Table 2 shows a normal CP and Table 3 shows an extended CP.

TABLE 2

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |

TABLE 2-continued

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 3

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 11:
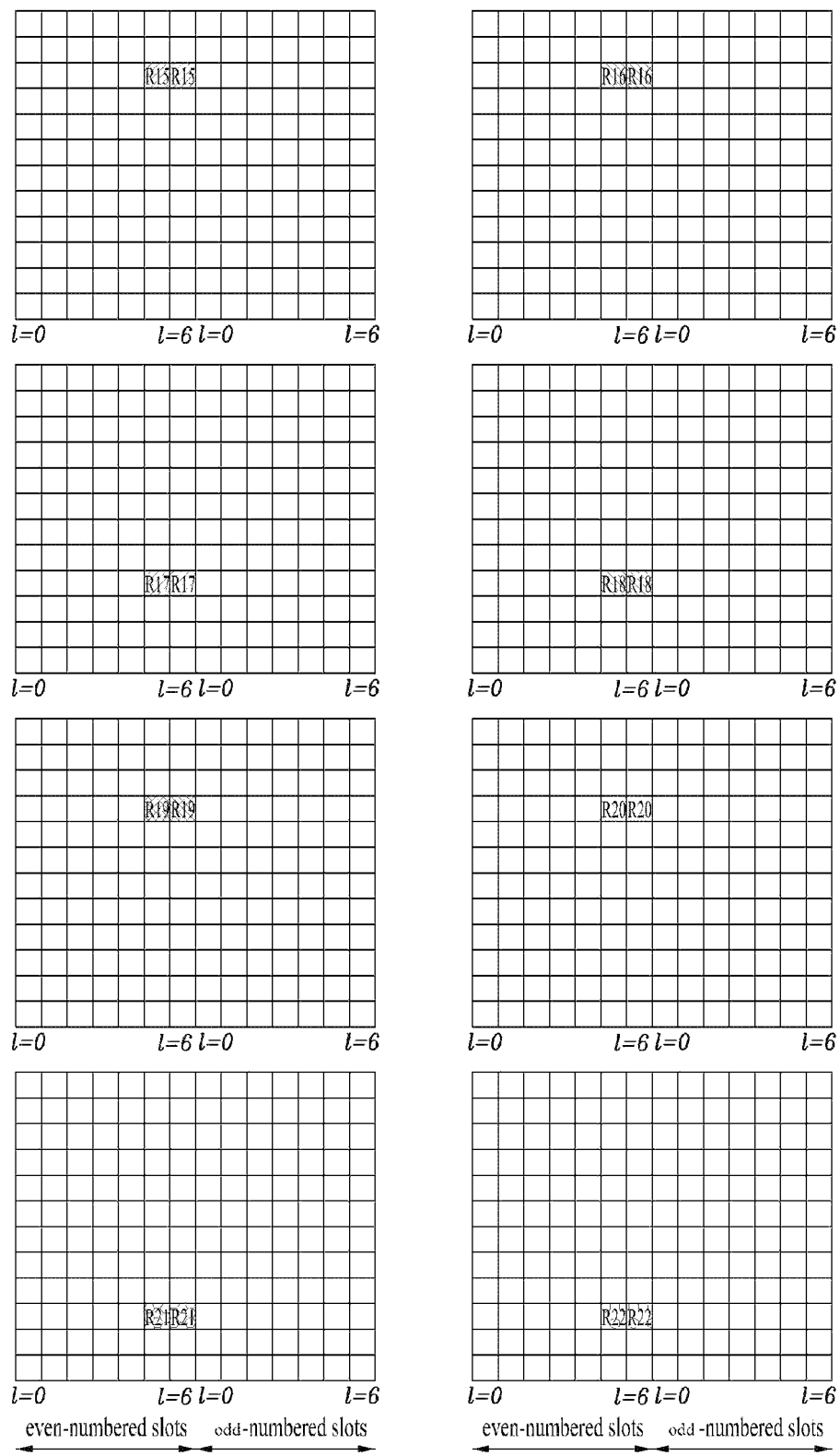
FIG. 11 is a diagram for an example of a CSI-RS configuration #0 in case of a normal CP among downlink CSI-RS configurations defined by a current 3GPP standard document.

In Tables 1 and 2, (k', l') denote an RE index, k' denotes a subcarrier index and l' denotes an OFDM symbol index. FIG. 11 shows CSI-RS configuration #0 in a normal CP among CSI-RS configurations defined in the current 3GPP standard.

In addition, a CSI-RS subframe configuration may be defined and includes periodicity $T_{CSI-RS}$ expressed in subframe units and a subframe offset $\Delta_{CSI-RS}$. Table 4 below shows a CSI-RS subframe configuration defined in the 3GPP standard.

TABLE 4

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ - 5 |
| 15-34 | 20 | $I_{CSI-RS}$ - 15 |
| 35-74 | 40 | $I_{CSI-RS}$ - 35 |
| 75-154 | 80 | $I_{CSI-RS}$ - 75 |

Currently, information on a zero-power (ZP) CSI-RS is transmitted in a state of being included in a CSI-RS-Config-r10 message via an RRC layer signal as shown in Table 4 below. In particular, a ZP CSI-RS resource configuration includes zeroTxPowerSubframeConfig-r10 and a 16-bit bitmap zeroTxPowerResourceConfigList-r10. zeroTxPower-SubframeConfig-r10 indicates transmission periodicity of a ZP CSI-RS and a subframe offset via a value ICSI-RS corresponding to Table 5. zeroTxPowerResourceConfig-List-r10 indicates a ZP CSI-RS configuration and each element of the bitmap indicates configurations included in a column in which the number of CSI-RS antenna ports is 4 in Table 2 or 3. That is, according to the current 3GPP standard, the ZP CSI-RS is defined only when the number of CSI-RS antenna ports is 4.

Meanwhile, when the aforementioned CoMP scheme is used, a plurality of CSI-RS configurations may be configured for the user equipment through RRC layer signal. Each of the CSI-RS configurations is defined as illustrated in Table 5 below. Referring to Table 5, it is noted that information on CRS, which enables QCL (Quasi Co-Location) assumption, is included in each of the CSI-RS configurations.

is a parameter set for receiving a PDSCH of the CoMP scheme and detailed values of the parameter sets are previously signaled through a higher layer. That is, for Table 6 below, a total of four parameter sets may be signaled semi-statically through an RRC layer signal, and the PQI field of the DCI format 2D dynamically indicates one of the total of four parameter sets.

TABLE 6

| Value of 'PDSCH RE Mapping and Quasi-Co-Location Indicator' field | Description |
|---|---|
| '00' | Parameter set 1 configured by higher layers |
| '01' | Parameter set 2 configured by higher layers |
| '10' | Parameter set 3 configured by higher layers |
| '11' | Parameter set 4 configured by higher layers |

The information included in the parameter set includes one or more of the number (crs-PortsCount) of CRS antenna ports, a frequency shift value of CRS (crs-FreqShift), MBSFN subframe configuration (mbsfn-subframeConfig-List), ZP CSI-RS configuration (csi-RS-ConfigZPId), PDSCH start symbol (pdsch-Start), and QCL (Quasi Co-Location) information of NZP (Non-ZP) CSI-RS (qcl-CSI-RS-ConfigNZPId).

In the following, QCL (Quasi Co-Location) between antenna ports is explained.

QCL between antenna ports indicates that all or a part of large-scale properties of a signal (or a radio channel corresponding to a corresponding antenna port) received by a user equipment from a single antenna port may be identical to large-scale properties of a signal (or a radio channel corresponding to a corresponding antenna port) received from a different single antenna port. In this case, the larger-scale properties may include Doppler spread related to frequency offset, Doppler shift, average delay related to timing offset,

TABLE 5

CSI-RS-ConfigNZP information elements

```
-- ASN1START
CSI-RS-ConfigNZP-r11 ::=            SEQUENCE {
    csi-RS-ConfigNZPId-r11              CSI-RS-ConfigNZPId-r11,
    antennaPortsCount-r11               ENUMERATED {an1, an2, an4, an8},
    resourceConfig-r11                  INTEGER (0..31)
    subframeConfig-r11                  INTEGER (0..154),
    scramblingIdentity-r11              INTEGER (0..503),
    qrl-CRS-Info-r11                    SEQUENCE {
        qcl-ScramblingIdentity-r11          INTEGER (0..503),
        crs-PortsCount-r11                  ENUMERATED {n1, n2, n4, spare1},
        mbsfn-SubframeConfigList-r11        CHOICE {
            release                             NULL,
            setup                               SEQUENCE {
                subframeConfigList                  MBSFN-SubframeConfigList
            }
        }                                                           OPTIONAL    -- Need ON
    }                                                               OPTIONAL,   -- Need OR
    ...
}
-- ASN1STOP
```

Meanwhile, in the recent 3GPP LTE-A standard, for a transmission mode 10, which corresponds to PDSCH transmission of the CoMP scheme, a PQI (PDSCH RE Mapping and Quasi-Co-Location Indicator) field has been defined in a DCI format 2D. In more detail, the PQI field is defined by 2-bit size and indicates a total of four states as illustrated in Table 6 below, wherein information indicated by each state delay spread and the like. Moreover, the larger-scale properties may include average gain as well.

According to the aforementioned definition, a user equipment cannot assume that the large-scale properties are identical to each other between antenna ports not in the QCL, i.e., NQCL (Non Quasi co-located) antenna ports. In this case, the user equipment should independently perform a tracking procedure to obtain frequency offset, timing offset and the like according to an antenna port.

On the contrary, the user equipment can perform following operations between antenna ports in QCL.

1) The user equipment can identically apply power-delay profile for a radio channel corresponding to a specific antenna port, delay spread, Doppler spectrum and Doppler spread estimation result to a Wiener filter parameter, which is used for estimating a channel for a radio channel corresponding to a different antenna port, and the like.

2) After obtaining time synchronization and frequency synchronization for the specific antenna port, the user equipment can apply identical synchronization to a different antenna port as well.

3) The user equipment can calculate an average value of RSRP (reference signal received power) measurement values of each of the antenna ports in QCL to obtain average gain.

For instance, having received DM-RS based downlink data channel scheduling information (e.g., DCI format 2C) via PDCCH (or E-PDCCH), the user equipment performs channel estimation for PDSCH via a DM-RS sequence indicated by the scheduling information and may be then able to perform data demodulation.

In this case, if a DM-RS antenna port used for demodulating a downlink data channel and a CRS antenna port of a serving cell are in QCL, when the user equipment performs a channel estimation via the DM-RS antenna port, the user equipment can enhance reception capability of the DM-RS based downlink data channel in a manner of applying large-scale properties of a radio channel estimated from a CRS antenna port of the user equipment as it is.

Similarly, if a DM-RS antenna port used for demodulating a downlink data channel and a CSI-RS antenna port of a serving cell are in QCL, when the user equipment perform a channel estimation via the DM-RS antenna port, the user equipment can enhance reception capability of the DM-RS based downlink data channel in a manner of applying large-scale properties of a radio channel estimated from a CSI-RS antenna port of the serving cell as it is.

Meanwhile, the LTE system defines that the base station configures one of a QCL type A and a QCL type B for the user equipment through the higher layer signal when a downlink signal is transmitted in a transmission mode 10 which is a CoMP mode.

In this case, the QCL type A assumes that antenna ports of CRS, CSI-RS and DM-RS are quasi-co-located (QCL) for the other broad range properties except average gain, and means that physical channels and signals are transmitted from the same node (point).

On the other hand, the QCL type B assumes that antenna ports of DM-RS and specifically indicated CSI-RS are quasi-co-located (QCL) for the other broad range properties except average gain. In particular, the QCL type B is defined such that maximum four QCL modes are configured for each user equipment through a higher layer message to enable CoMP transmission such as DPS and JT and whether the downlink signal should be received through which one of the four QCL modes is dynamically configured through downlink control information (DCI). This information is defined in qcl-CSI-RS-ConfigNZPId of the parameter sets of the PQI field.

DPS transmission in case that the QCL type B is configured will be described in more detail.

First of all, it is assumed that a node #1 comprised of $N_1$ number of antenna ports transmits CSI-RS resource #1, a node #2 comprised of $N_2$ number of antenna ports transmits CSI-RS resource #2. In this case, the CSI-RS resource #1 is included in the parameter set #1 of the PQI, and the CSI-RS resource #2 is included in the parameter set #2 of the PQI. Moreover, the base station signals the parameter set #1 and the parameter set #2 to the user equipment, which exists in a common coverage of the node #1 and the node #2, through the higher layer.

Afterwards, the base station may perform DPS in such a manner that the parameter set #1 is configured for the corresponding user equipment by using DCI through the node #1 during data (that is, PDSCH) transmission and the parameter set #2 is configured through the node #2 during data transmission. In view of the user equipment, it may be assumed that the CSI-RS resource #1 and DM-RS are in QCL if the parameter set #1 is configured through the PQI by using the DCI and the CSI-RS resource #2 and DM-RS are in QCL if the parameter set #2 is configured through the PQI.

Hereinafter, PRB bundling will be described.

PRB bundling means that a plurality of resource blocks on a frequency domain are assumed as one granularity for precoding to allow the user equipment configured in a transmission mode 9 to perform PMI/RI reporting.

A system bandwidth is divided into a fixed system bandwidth in accordance with a size P' of precoding resource block groups (PRGs), wherein each PRG is comprised of consecutive PRBs. If $N_{RB}^{DL}$ mod P'>0, a size of one of the precoding resource block groups (PRGs) is $N_{RB}^{DL} - P' \lfloor N_{RB}^{DL}/P' \rfloor$.

The size of the PRG assumed by the user equipment in the LTE system will be described in more detail with reference to Table 7. The LTE system defines the size of the PRB assumed by the user equipment for the given system bandwidth as illustrated in Table 7 below.

TABLE 7

| System Bandwidth ($N_{RB}^{DL}$) | PRG Size (P') (PRBs) |
|---|---|
| ≤10 | 1 |
| 11-26 | 2 |
| 27-63 | 3 |
| 64-110 | 2 |

For example, if $N_{RB}^{DL}$ is 25, the size of the PRG is defined as 2 as illustrated in Table 7. Therefore, one of PRGs includes one PRB during PRB bundling. That is, the system bandwidth is divided into a total of 13 PRGs, that is, 12 PRGs comprised of two PRBs and one PRG comprised of one PRB. At this time, the user equipment UE may assume that the same precoder may be applied to all the scheduled PRBs which belong to one PRG.

Meanwhile, channel estimation for the PDSCH is performed through the DM-RS transmitted using the same antenna port (AP) through which the PDSCH is transmitted, having a signature which is previously defined. On the other hand, interference estimation may be performed from a specific RE, and since the UE may identify a direction of interference based on the estimated interference value, the UE may form its received beam to receive the PDSCH in a direction for avoiding such interference. The specific RE for such interference estimation may be referred to as DM-IM (demodulation interference measurement resource), and is preferably configured as RE, to which a PDSCH signal is not transmitted, to prevent the PDSCH signal from being included in interference estimation.

Also, since the interference estimation is operation for estimating interference for demodulation of the PDSCH, the interference estimation is differentiated from interference measurement for feedback of channel state information. For reference, interference measurement for feedback of channel state information is performed using CSI IM resource defined as the aforementioned ZP CSI. In particular, unlike interference measurement for feedback of channel state information, which is intended to mainly measure intensity of an average interference signal, interference estimation for PDSCH demodulation is selectively performed in a resource only corresponding to the same interference status as that of a specific PDSCH for demodulation. The DM-IM resource may be configured independently from the CSI IM resource, or may be configured in a type of a subset of the CSI IM resource.

The aforementioned channel estimation and the aforementioned interference estimation have a common point in that both of them are signal estimation operations at a resource which is previously designated. Therefore, if such estimation operations are performed at more resources, more exact estimation values may be obtained. However, since PDSCH signal transmission has not been performed at such measurement resources, it is not preferable that the estimation values are increased to increase overhead per resource unit (for example, one PRB pair).

Therefore, it is more effective to perform channel and interference estimation by using resources existing in a plurality of resource units in a state that overhead per resource unit is fixed. This may be referred to as "measurement resource combination". At this time, in order to perform the estimation operation by using the resources existing in the plurality of resource units, the UE should assume that the channel status observed in the corresponding resource unit is the same as the interference status, or should assume that an error within a level that does not degrade estimation performance is only generated. PRB bundling in the legacy frequency domain is one method of estimation resource combination for improving performance of channel estimation by using resources in a plurality of frequency resource units, and the eNB should maintain the same precoding within one PRG such that the channel status may be maintained equally at different PRB pairs.

First of all, the present invention suggests that measurement resource combination operation should be performed even in a time domain as a solution which may be used if measurement resource combination is not proper in the frequency domain, or to improve additional estimation performance in addition to measurement resource combination in the frequency domain. That is, channel and interference estimation is performed on the assumption that the same precoding and interference are applied to the DM-RS or/and DM-IM resource, which are located at a series of subframes.

Hereinafter, a method for indicating measurement resource combination in a time domain, that is, subframe dimension will be described in detail.

First of all, the eNB may determine that the measurement resource combination operation is favorable or unfavorable in the subframe dimension depending on the status and notify the UE whether measurement resource combination may be performed at the subframe dimension. Additionally, the eNB may indicate whether the measurement resource combination is available and also indicate how many subframes may be used to perform the measurement resource combination. For example, the eNB may group L number of continuous subframes into one group and maintain precoding and interference applied to the DM-RS or/and DM-IM resource equally in the corresponding group. The series of subframes grouped as described above may be referred to as a measurement subframe group. For example, the subframe having the same value of $$\left\lfloor \frac{10 \cdot N_{radio\ frame} + n_{subframe}}{L} \right\rfloor$$

may be operated to be a target of measurement resource combination. In this case, $N_{radio\ frame}$ refers to a radio frame index, and $n_{subframe}$ refers to a subframe index.

However, if the two subframes do not belong to the same measurement resource combination target even though the two subframes are adjacent to each other, measurement resource combination is not performed on the assumption that different precodings and different interferences are respectively applied to the DM-RS and the DM-IM resource at the two subframes.

Figure 12:
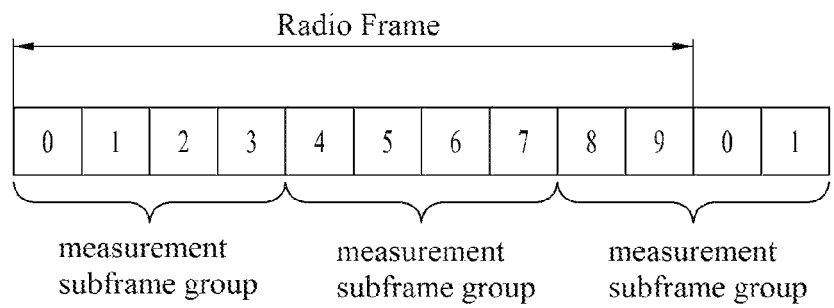
FIG. 12 is a diagram illustrating an example of a measurement subframe group configured in accordance with the embodiment of the present invention.

FIG. 12 is a diagram illustrating an example of a measurement subframe group configured in accordance with the embodiment of the present invention. In particular, in FIG. 12, it is assumed that the measurement subframe group is configured by grouping four neighboring subframes.

In more detail, the size and location of the measurement subframe group for channel estimation operation of the DM-RS and interference estimation operation at the DM-IM RE may be configured differently, and whether measurement resource combination may be performed may be configured differently. For example, although measurement resource combination at the subframe dimension is not available for channel estimation, measurement resource combination at the subframe dimension may be configured for interference estimation. This means that precoding applied to the PDSCH of the corresponding UE is varied depending on subframes but precoding of a signal acting as interference on the corresponding UE is equally applied from the measurement subframe group.

The PDSCH may not be transmitted any more from one measurement subframe group in a cell which actually affects interference. In this case, the cell which actually affects interference may transmit a signal having the same precoding in only a region corresponding to the DM-IM RE, whereby the UE affected by interference may be operated to continuously observe interference precoding.

The measurement resource combination at the subframe dimension may be used effectively for the UE which is moved at low speed. If the PRB into which the PDSCH is mapped is configured differently depending on the subframes, the measurement resource combination may restrictively be applied to the PRB only into which the PDSCH is commonly mapped at the two subframes to which the measurement resource combination is applied.

Meanwhile, even in case of the subframes which belong to one measurement subframe group, some of the subframes may be excluded from the measurement resource combination. For example, if the cell affected by interference from a specific subframe transmits different types of signals such as PMCH, an interference signal is caused, which is different from those of the other subframes which belong to the same measurement subframe group. In this case, since it is preferable to exclude such a subframe from the measurement resource combination, the eNB may designate the location of the subframe excluded from the measurement resource combination at the DM-RS and/or DM-IM through the higher layer signal such as RRC.

The aforementioned measurement resource combination operation at the subframe dimension may be used at one subframe more usefully than multi-subframe scheduling for scheduling the PDSCH at a plurality of subframes. That is, if the PDSCH for L number of subframes is scheduled at one time, the UE may perform the measurement resource combination at channel and interference estimation by regarding the corresponding L number of subframes as one measurement subframe group.

The aforementioned measurement resource combination operation may be performed even in the PRB region. The aforementioned PRB bundling corresponds to the measurement resource combination operation at the PRB region in channel estimation. The measurement resource combination operation at a plurality of neighboring PRB regions may be applied to the DM-IM resource based interference estimation. Whether the DM-IM resource based interference estimation is available may be configured separately from the operation at channel estimation, or if the DM-IM resource is configured and the PRB region measurement resource combination of channel estimation is applied, the interference estimation may be operated to be automatically applied together with the operation at channel estimation.

When interference is measured on the assumption of the same interference at the DM-IM resource existing in a plurality of PRBs, if neighboring cells at some PRBs fail to maintain the same interference precoding, interference measurement performance of the UE is significantly deteriorated. For example, if the neighboring cells transmit EPDCCH (Enhanced PDCCH), to which a precoding mode different from that of a neighboring PDSCH is applied, by using a specific PRB, or transmit a signal such as PMCH, the same interference precoding cannot be assumed even in case of the same PRB bundle, that is, PRG. (In this case, EPDCCH is a control channel transmitted from the legacy PDSCH region, and is characterized in that DM-RS based demodulation is performed.) Therefore, the UE may exclude such specific PRBs from measurement resource combination at interference measurement, and the eNB may designate PRBs which should be excluded from the measurement resource combination through the higher layer signal such as RRC.

The eNB may designate a specific PRB at a specific subframe by combining with a signal indicating the location of the subframe excluded from the aforementioned measurement resource combination and notify that the specific PRB should be excluded from the measurement resource combination. Alternatively, the eNB may notify a set of PRBs, in which DM-IM resource to which measurement resource combination may be applied exists, by assuming the same interference through the higher layer signal such as RRC.

Meanwhile, the aforementioned measurement resource combination is advantageous in that estimation performance may be improved as the same precoding is maintained over a plurality of resources. By contrast, the aforementioned measurement resource combination has a problem in that adaptability based on the status is deteriorated as precoding is fixed.

Figure 13:
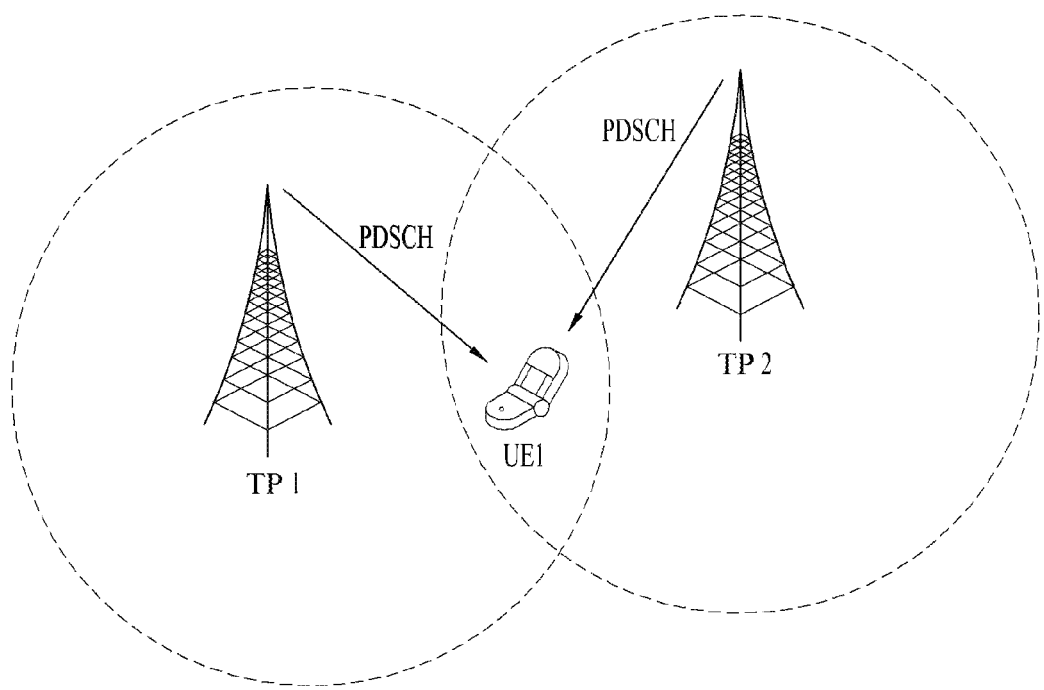
FIG. 13 is a diagram illustrating problems of measurement resource combination.

FIG. 13 is a diagram illustrating problems of measurement resource combination.

As illustrated in FIG. 13, the UE which performs CoMP operation capable of receiving signals from a plurality of transmission points has a restriction that the UE should receive a signal from one transmission point only in a plurality of resources. Therefore, the present invention suggests that time and/or frequency resources for receiving a PDSCH should be divided additionally and a transmission point for transmitting the PDSCH in each time/frequency resource should be changed so that the UE, which performs CoMP operation, may receive the PDSCH from various transmission points.

In particular, the present invention suggests that CRS and/or CSI-RS which is a reference of QCL in a specific resource region should be changed if the transmission point for transmitting a PDSCH in the corresponding resource region is changed. This operation may usefully be used for the operation for transmitting many data to the corresponding UE at one time by using many time/frequency resources by transmitting a PDSCH through another transmission point in a resource where one transmission point performs muting if each transmission point which becomes a CoMP target of the corresponding UE may perform a muting operation for not transmitting a signal at some subframe or PRB for interference control with its neighboring transmission point and locations of resources where each transmission point performs muting are configured differently from one another.

For example, the transmission point for transmitting a PDSCH may be changed at each subframe.

Figure 14:
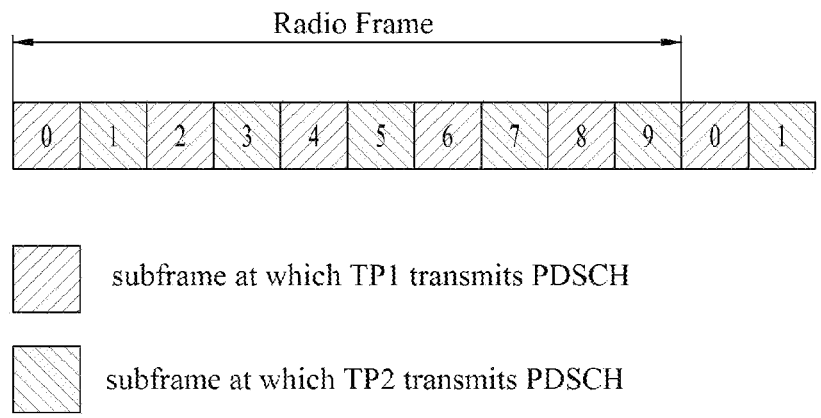
FIG. 14 is a diagram illustrating an example of a transmission point for transmitting a PDSCH, which is changed in a unit of subframe in accordance with the embodiment of the present invention.

FIG. 14 is a diagram illustrating an example of a transmission point for transmitting a PDSCH, which is changed in a unit of subframe in accordance with the embodiment of the present invention.

Referring to FIG. 14, it is noted that a transmission point 1 transmits a PDSCH at an even numbered subframe and a transmission point 2 transmits a PDSCH at an odd numbered subframe. In this case, if measurement resource combination at the aforementioned subframe dimension is configured, that is, if four neighboring subframes are designated as one measurement subframe group as shown in FIG. 12, the UE may perform the measurement resource combination operation by regarding that the same precoding is applied to DM-RS at subframes transmitted by the same transmission point transmit within one measurement subframe group, that is, DM-RS at subframes having the same QCL reference.

The same principle may be applied to interference estimation at the DM-IM RE. The eNB may previously transfer QCL information at each subframe to the UE through signaling such as RRC. This may be understood that CRS/CSI-RS which is a reference of QCL may be subjected to hopping in accordance with subframes. In particular, if multi-subframe scheduling is performed, it is favorable that QCL reference hopping pattern is previously designated. Alternatively, a plurality of QCL reference hopping patterns may be designated previously and then a hopping pattern, which is actually used, index of CRS/CSI-RS which becomes a reference of QCL at interference estimation in another sense, may be designated through DCI for scheduling a PDSCH.

Figure 15:
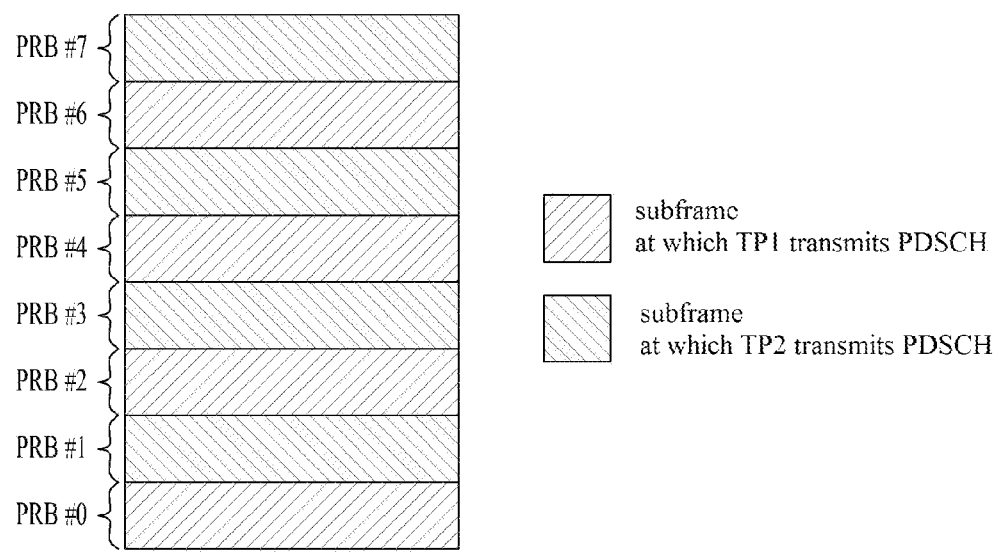
FIG. 15 is a diagram illustrating an example of a transmission point for transmitting a PDSCH, which is changed in a unit of PRB in accordance with the embodiment of the present invention.

For another example, a transmission point for transmitting a PDSCH may be changed in each PRB pair. FIG. 15 is a diagram illustrating an example of a transmission point for transmitting a PDSCH, which is changed in a unit of PRB in accordance with the embodiment of the present invention.

Referring to FIG. 15, a transmission point 1 transmits a PDSCH in an even numbered PRB pair, and a transmission point 2 transmits a PDSCH in an odd numbered PRB pair. This operation may mean that CRS/CSI-RS which becomes a reference of QCL should be changed as the transmission point is changed. That is, it may be understood that "CRS/CSI-RS which becomes a reference of QCL is subjected to hopping in accordance with PRB".

To this end, the eNB may previously designate, for the UE, a QCL reference hopping pattern which will be used at each subframe. Alternatively, the eNB may previously designate a plurality of QCL reference hopping patterns and then may designate a hopping pattern which is actually used at the corresponding subframe, through DCI for scheduling a PDSCH.

This QCL reference hopping at the PRB dimension may be used together with PRB bundling. That is, channel estimation and/or interference estimation may be performed by assuming that the same precoding is applied to PRBs having the same QCL reference, among PRBs which belong to the same PRG. Alternatively, a unit of QCL reference hopping at a PRB dimension may be set to PRG, so that all the PRBs may be operated to have the same QCL reference within one PRG which becomes a unit of PRB bundling.

In hopping the QCL reference on a PRB within one subframe, the same reference is applied to CRS, which is used for frequency offset correction of a receiver, in all PRBs, whereby all received signals from one frequency offset correction value may be recovered at one time, while CSI-RS which becomes a reference of a parameter such as delay spread applied to a channel estimation filter of an individual PRB may be configured differently per PRB.

The aforementioned measurement resource combination operation and time/frequency domain hopping operation of QCL information may be applied to an operation for transmission and reception of different channels having similar DM-RSs and/or DM-IM REs, for example, a DM-RS based EPDCCH or a channel for transferring system information based on the DM-RS.

Figure 16:
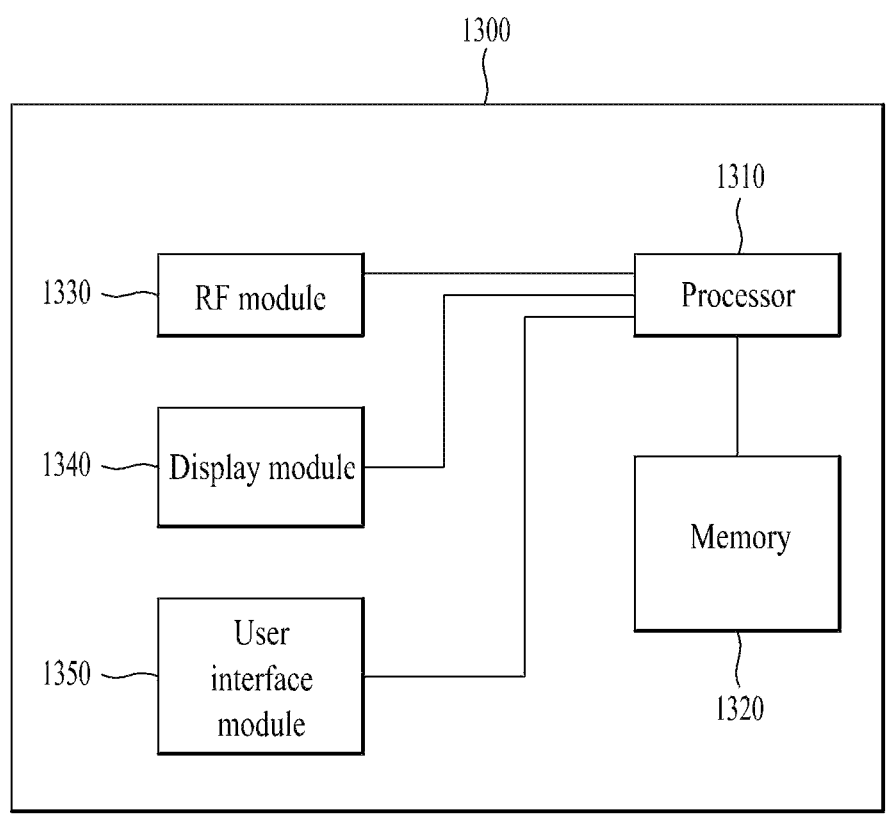
FIG. 16 is a block diagram for an example of a communication device according to one embodiment of the present invention.

FIG. 16 is a block diagram for an example of a communication device according to one embodiment of the present invention.

Referring to FIG. 16, a communication device 1300 may include a processor 1310, a memory 1320, an RF module 1330, a display module 1340, and a user interface module 1350.

Since the communication device 1300 is depicted for clarity of description, prescribed module(s) may be omitted in part. The communication device 1300 may further include necessary module(s). And, a prescribed module of the communication device 1300 may be divided into subdivided modules. A processor 1310 is configured to perform an operation according to the embodiments of the present invention illustrated with reference to drawings. In particular, the detailed operation of the processor 1310 may refer to the former contents described with reference to FIG. 1 to FIG. 15.

The memory 1320 is connected with the processor 1310 and stores an operating system, applications, program codes, data, and the like. The RF module 1330 is connected with the processor 1310 and then performs a function of converting a baseband signal to a radio signal or a function of converting a radio signal to a baseband signal. To this end, the RF module 1330 performs an analog conversion, amplification, a filtering, and a frequency up conversion, or performs processes inverse to the former processes. The display module 1340 is connected with the processor 1310 and displays various kinds of informations. And, the display module 1340 can be implemented using such a well-known component as an LCD (liquid crystal display), an LED (light emitting diode), an OLED (organic light emitting diode) display and the like, by which the present invention may be non-limited. The user interface module 1350 is connected with the processor 1310 and can be configured in a manner of being combined with such a well-known user interface as a keypad, a touchscreen and the like.

The memory 1620 is connected with the processor 1610 and stores an operating system, applications, program codes, data, and the like. The RF module 1630 is connected with the processor 1610 and then performs a function of converting a baseband signal to a radio signal or a function of converting a radio signal to a baseband signal. To this end, the RF module 1630 performs an analog conversion, amplification, a filtering, and a frequency up conversion, or performs processes inverse to the former processes. The display module 1640 is connected with the processor 1610 and displays various kinds of informations. And, the display module 1640 can be implemented using such a well-known component as an LCD (liquid crystal display), an LED (light emitting diode), an OLED (organic light emitting diode) display and the like, by which the present invention may be non-limited. The user interface module 1650 is connected with the processor 1610 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although the aforementioned method for measuring a channel and interference in a wireless communication system has been described based on an example applied to the 3GPP LTE system, the method may be applied to various wireless communication systems in addition to the 3GPP LTE system.

The invention claimed is:

1. A method for enabling a user equipment to perform a measurement in a wireless communication system, the method comprising:
receiving, from a network, information on a measurement resource combination;
grouping a plurality of time-domain measurement resources into a time-domain measurement resource group by using the information on the measurement resource combination; and
performing the measurement on an assumption that same precoding is applied to or same interference occurs in the time-domain measurement resource group,
wherein the information on the measurement resource combination includes information on a number of the plurality of time-domain measurement resources.

2. The method according to claim 1, wherein the information on the measurement resource combination includes information on a number of continuous time-domain measurement resources and information on at least one time-domain measurement resource which is not grouped into the time-domain measurement resource group among the continuous time-domain measurement resources.

3. The method according to claim 1, further comprising: grouping a plurality of frequency-domain measurement resources into a frequency-domain measurement resource group of the time-domain measurement resource group by using the information on the measurement resource combination,
wherein the performing the measurement comprises assuming that the same precoding is applied to or the same interference occurs in the frequency-domain measurement resource group of the time-domain measurement resource group.

4. The method according to claim 3, wherein the information on the measurement resource combination includes information on a number of continuous frequency-domain measurement resources and information on at least one frequency-domain measurement resource which is not grouped into the frequency-domain measurement resource group among the continuous frequency-domain measurement resources.

5. The method according to claim 1, further comprising:
receiving information on a QCL (Quasi Co-Location) hopping pattern from the network,
wherein the QCL hopping pattern divides the plurality of time-domain measurement resources in accordance with a transmission point of a downlink signal.

6. The method according to claim 5, wherein the QCL hopping pattern includes information on a change of a reference signal which is a reference of the QCL.

7. The method according to claim 1, further comprising:
receiving downlink control information from the network,
wherein the downlink control information schedules downlink transmission at the plurality of time-domain measurement resources.

8. A user equipment in a wireless communication system, the user equipment comprising:
a wireless communication module configured to transmit and receive a signal to and from a network; and
a processor configured to process the signal,
wherein the processor groups a plurality of time-domain measurement resources into a time-domain measurement resource group by using information on a measurement resource combination, which is received from the network and performs a measurement on an assumption that same precoding is applied to or same interference occurs in the time-domain measurement resource group, and the information on the measurement resource combination includes information on a number of the plurality of time-domain measurement resources.

9. The user equipment according to claim 8, wherein the information on the measurement resource combination includes information on a number of continuous time-domain measurement resources and information on at least one time-domain measurement resource which is not grouped into the time-domain measurement resource group among the continuous time-domain measurement resources.

10. The user equipment according to claim 8, wherein:
the processor groups a plurality of frequency-domain measurement resources into a frequency-domain measurement resource group of the time-domain measurement resource group by using the information on the measurement resource combination, and
the measurement is performed on the assumption that the same precoding is applied to or the same interference occurs in the frequency-domain measurement resource group of the time-domain measurement resource group.

11. The user equipment according to claim 10, wherein the information on the measurement resource combination includes information on number of continuous frequency-domain measurement resources and information on at least one frequency-domain measurement resource which is not grouped into the frequency-domain measurement resource group among the continuous frequency-domain measurement resources.

12. The user equipment according to claim 8, wherein the processor receives information on a QCL (Quasi Co-Location) hopping pattern from the network, and the QCL hopping pattern divides the plurality of time-domain measurement resources in accordance with a transmission point of a downlink signal.

13. The user equipment according to claim 12, wherein the QCL hopping pattern includes information on a change of a reference signal which is a reference of the QCL.

14. The user equipment according to claim 8, wherein the wireless communication module receives downlink control information from the network, and the downlink control information schedules downlink transmission at the plurality of time-domain measurement resources.

* * * * *